United States Patent [19]

Zander et al.

[11] Patent Number: 5,016,442
[45] Date of Patent: May 21, 1991

[54] MASTER CYLINDER WITH FLUID LEVEL AND PRESSURE FAILURE DETECTOR

[75] Inventors: Richard A. Zander, Niles; Robert F. Gaiser, Stevensville, both of Mich.; Donald A. Crumb, Granger, Ind.

[73] Assignee: Allied-Signal Inc., Morristown, N.J.

[21] Appl. No.: 385,502

[22] Filed: Jul. 27, 1989

[51] Int. Cl.⁵ .............................................. F15B 7/00
[52] U.S. Cl. ..................................... 60/535; 340/452; 60/545
[58] Field of Search .................. 60/534, 535, 545, 561, 60/562; 340/450.1, 452; 200/82 D, 82 E

[56] References Cited

U.S. PATENT DOCUMENTS

| | | | |
|---|---|---|---|
| 3,538,274 | 11/1970 | Gfeller | 200/82 E X |
| 3,603,925 | 9/1971 | Hughes | 340/450.1 |
| 3,872,885 | 3/1975 | Eloi et al. | 200/82 D X |
| 3,896,280 | 7/1975 | Blake | 200/82 E X |
| 3,947,648 | 3/1976 | Muterel | 340/452 X |
| 3,947,813 | 3/1976 | Uemura et al. | 340/450.1 |
| 4,017,124 | 4/1977 | Cadeddu | 340/452 X |
| 4,082,930 | 4/1978 | Peeples | 340/450.1 |
| 4,090,050 | 5/1978 | Siiberg | 340/450.1 X |
| 4,217,779 | 4/1980 | Masuda et al. | 340/450.1 X |
| 4,301,653 | 11/1981 | Carre et al. | 60/535 |
| 4,472,943 | 9/1984 | Grabill | 60/585 |
| 4,604,866 | 8/1986 | Gaiser | 60/535 |
| 4,914,916 | 4/1990 | Leigh-Monstevens et al. | 60/534 |

FOREIGN PATENT DOCUMENTS

| | | | |
|---|---|---|---|
| 0123557 | 9/1980 | Japan | 60/535 |
| 1486208 | 9/1977 | United Kingdom | 60/535 |

Primary Examiner—John T. Kwon
Assistant Examiner—John Ryznic
Attorney, Agent, or Firm—Leo H. McCormick, Jr.; Ken C. Decker

[57] ABSTRACT

A master cylinder having a housing with a first bore therein for retaining a pair of pistons which move in response to an input force and develop fluid pressure to effect a brake application. A second bore in the housing carries a differential area piston connected to the pressure chambers. A reed switch retained in the housing is aligned with a first magnet located on a float in a reservoir and a second magnet is attached to the differential area piston. A ferromagnetic shield located between the reed switch and second magnet has first and second openings located in a plane on either side of the reed switch. Should a failure occur in either pressure chamber, the differential area piston moves to allow magnetic field to pass through the openings in the shield and activate the reed switch to develop a warning signal and inform an operator of a failure mode condition in the master cylinder.

4 Claims, 2 Drawing Sheets

MASTER CYLINDER WITH FLUID LEVEL AND PRESSURE FAILURE DETECTOR

The present invention relates to a master cylinder which generates fluid pressure for communication to separate brake circuits during a brake application. The master cylinder includes fluid level and pressure failure indicators which generate a warning signal should a failure mode occur in either the master cylinder or brake circuits.

Heretofore, master cylinders which included a fluid level indicator and a pressure failure indicator required modification of the master cylinder housing to accommodate a probe which extended into the housing. The probe detects movement of a piston in a bore of the housing in response to a fluid pressure differential or fluid level condition. In addition, the master cylinder housing was used as a part of the electric circuit for transmission of warning signals to the indicators. Such attempts to integrate a fluid level indicator and a pressure failure indicator in the master cylinder were not widely accepted by vehicle manufacturers. Examples of prior art master cylinders are illustrated in U.S. Pat. No. 4,084,377 and U.S. Pat. No. 3,560,918.

U.S Pat. No. 4,604,866 discloses a master cylinder which integrates a fluid level warning device and pressure failure indicator. In this device a pressure differential piston carries first and second magnets which move in response to a differential pressure to activate a reed switch and inform an operator of a failure in the brake system. This system while operating in an acceptable manner has not achieved customer acceptance due primarily to the increased cost of components such as the magnets and manufacturing cost of this master cylinder which requires much closer tolerances.

The present invention was developed in an effort to reduce manufacturing cost and yet improve the operational characteristics a master cylinder. The master cylinder includes a combined failure warning circuit for fluid level and pressure failure indicator that is compact without the need to make any substantial changes in a conventional master cylinder housing.

In the present invention, a master cylinder has a housing with a first bore for retaining a pair of pistons which move to develop fluid pressure in a pair of pressure chambers to effect a brake application. A reservoir attached to the housing contains fluid which is in communication with the pair of pressure chambers when the pistons are in a rest position. A differential area piston is connected to the pressure chambers and is operable during a brake application to actuate a signal circuit in response to a failure mode in either pressure chamber. A float located in the reservoir carries a first magnet for actuating a switch in the signal circuit when the fluid level in the reservoir is below a predetermined level. The invention is characterized in that the housing has a second bore for receiving the differential area piston and first and second passages connect the second bore to the pair of pressure chambers for presenting fluid pressure to said differential area piston and the switch has a reed assembly located in alignment with the first magnet carried by the float in the reservoir and a second magnet carried by the differential piston. The second bore receives a ferromagnetic shield member having first and second openings such that movement of the differential area piston as a result of a failure mode allows the magnetic field associated with the second magnet to pass through one of the first and second openings to activate the reed switch and close the circuit.

It is an advantage of the present invention that the reed switch is strategically located to pick up a signal from the float and the differential piston. Furthermore, the reservoir assembly accommodates the differential piston, the float and the reed switch so that the reservoir assembly can be tested separate from the master cylinder housing.

In the accompanying drawings.

Figures 1, 2:
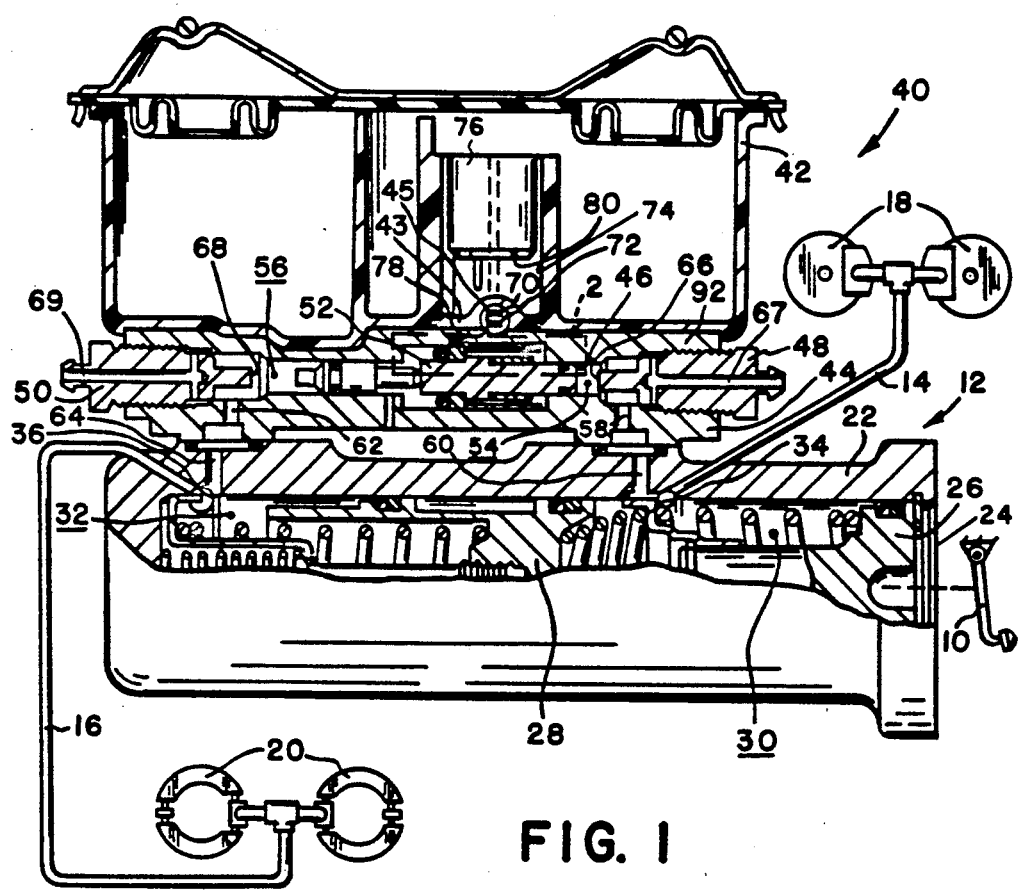
FIG. 1 is a sectional view of a master cylinder in a brake system having a failure indicator system made according to the principles of this invention.
FIG. 2 is an enlarged cross section taken along circumscribed area of FIG. 1.

A brake system includes a brake pedal 10 which is operated by a driver of a vehicle to control braking for the vehicle. The pedal 10 is connected to a master cylinder 12 for generating fluid pressure therein during braking which is communicated through a pair of conduits 14 and 16 to a pair of brakes 18 and 20. The master cylinder 12 has a housing 22 with an opening 24 moveably receiving a pair of pistons 26 and 28 which cooperate with the housing to form a pair of pressure chambers 30 and 32. The pistons 26 and 28 cooperate with a pair of tilt valves as illustrated in U.S. Pat. No. 4,472,943, however, for the sake of clarity the tilt valves are not illustrated. Each pressure chamber 30 and 32 communicates with a respective conduit 14 and 16 via an outlet port 34 and 36. The housing 22 carries a reservoir assembly 40 for communicating fluid to each pressure chamber when the pair of pistons 26 and 28 are in a rest position. The reservoir assembly 40 comprises a first part 42 made of a lightweight plastic material for retension of fluid and a second part 44 of rigid construction for attachment to the housing 22. The first part 42 is fastened to the second part 44 by forming the plastic material around a portion of the second part.

The second part 44 defines a stepped bore 46 extending therethrough with end plugs 48 and 50 closing opposite ends of the stepped bore 46. A differential area piston 52 is movably disposed in the stepped bore 46 to separate a pair of cavities 54 and 56. Cavity 54 communicates with the outlet port 34 via a passage 58 in second part 44 and a passage 60 in housing 22, while cavity 56 communicates with the outlet port 36 via a passage 62 in second part 44 and a passage 64 in housing 22. The plug 48 defines a stop 66 to limit movement of the differential area piston 52 in one direction while the plug 50 defines a stop 68 to limit movement of the differential piston in the opposite direction. Each plug is also provided with passages 67 and 69, respectively to bleed air from the stepped bore 46, the cavities 54 and 56 and the pressure chambers 30 and 32.

The first part 42 cooperates with the second part 44 to form a blind bore 70. A reed switch 72 is located in the blind bore 70. Directly over the reed switch 72, the second part 44 forms a channel 74 which retains a float 76. The float 76 moves up and down in the channel 74 as a function of the fluid level within the first part 42. An arcuate recess 78 is provided on the second 44 part so that the reed switch 72 is disposed as close as possible to the wall 77 of the stepped bore 46 at an intermediate location between the end plugs 48 and 50.

The float 76 carries a first magnet 80 directly above the reed switch 72 and the differential piston 52 carries a second magnet 82 which is normally located in bore 46 substantially at the midpoint between ports 58 and 62. A ferromagnetic shield 84 located in bore 46 has a first opening 83 and a second opening 85 such that in the rest position for piston 52 or with equal fluid pressure in chambers 30 and 32, magnet 82, magnet 80 on float 76 and reed switch 72 are located substantially in the same plane which is perpendicular to the bore 46. With piston the rest position, the ferromagnetic material of shield 84 prevents the magnetic field generated by magnet 82 from being transmitted to the reed switch 72. Shield 84 has a flange 87 that is located in a groove 89 in the housing to maintain openings 83 and 85 in a fixed position within bore 46.

The differential area piston 52 slidably engages a first seal 53 normally biased against a centering ring 55 and carries a second seal 57 at its end adjacent plug 48. The centering ring 55 engages shoulder 81 in shield 84 to limit the extent that seal 53 can move in bore 46. The differential area piston 52 has a projection 49 that slides in a groove 59 in bore 46 to maintain the magnet 82 in a plane in alignment with the reed switch 72. However the projection 49 has no effect on the separation of cavity 54 from cavity 56 as the engagement of seals 53 and 57 with differential area piston 52 isolates cavity 54 from the cavity 56.

Figure 3:
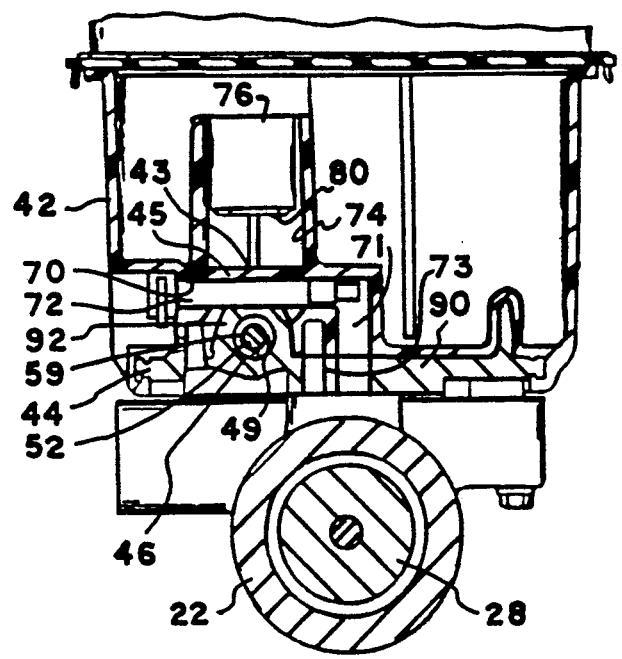
FIG. 3 is an end cross section taken along line 3—3 of FIG. 1.
Figure 4:
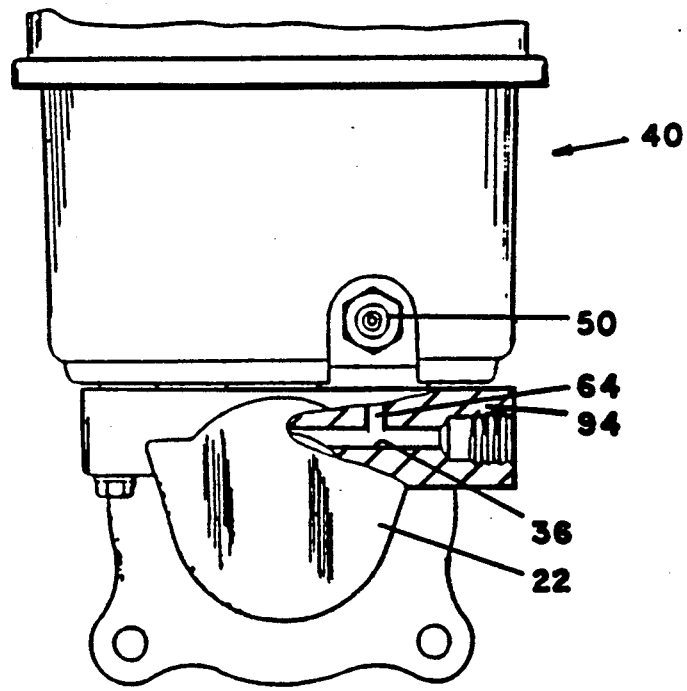
FIG. 4 is a view of an exit port of the master cylinder of FIG. 1.

During assembly, the reservoir assembly 40 is provided with the float 76, the reed switch 72 and the differential area piston 52 before attachment to the housing 22. The reed switch 72 is tested for accuracy by positioning magnet 80 on float 76 adjacent the reed switch 72 and moving the differential piston 52 to position magnet 82 directly below either opening 83 or 85 to operate the reed switch 72. To facilitate insertion of the reed switch 72 in the second or blind bore 70, the second bore 70 terminates in an opening 71, see FIG. 3. The second bore 70 extends downward through the second part 44 via aperture 73. Consequently, air is not trapped in the second bore 70 when the reed switch 72 is inserted therein. The reservoir assembly 40 is then attached to the housing 22 and fluid added to the reservoir assembly 40 and housing 22. The plugs 48 and 50 are opened slightly to permit air to easily escape from pressure chambers 30 and 32 and cavities 54 and 56 via the passages 67 and 69.

During a brake application brake pedal 10 is pivoted in a clockwise direction to impart movement to the pistons 26 and 28, thereby generating fluid pressure in the pressure chambers 30 and 32, the brake circuits 14 and 16, and the cavities 54 and 56. If each brake circuit 14 and 16 and each brake assembly 18 and 20 are sealed properly against fluid leakage, the fluid pressure developed in the cavities 54 and 56 is substantially identical. With the area of the differential diameter piston 52 at seal 53 slightly less than the diameter of the stepped bore at seal 57, the fluid pressure acting on the centering ring 55 is transferred to shoulder 51 and moves piston 52 toward chamber 54 in opposition to the fluid pressure acting on the larger diameter of the piston 52 in chamber 54. This movement continues until shoulder 81 stops the movement of centering ring 55 and piston 52 toward chamber 54 to position, the differential area piston 52 in the rest position as illustrated in FIG. 1 and retain the magnet 82 an equal distance from openings 83 and 85 to prevent its magnetic field from operating the reed switch 72. In the alternative, if either brake circuit develops a leak so that fluid pressure is not maintained in that circuit, the other circuit operates during braking to bias the differential area piston 52 away from the illustrated position and into abutment with stop 66 or 68 such that opening 83 or 85 is in alignment with magnet 82. Once the magnet 82 is aligned with opening 83 or 85, the magnetic field closes the reed switch 72 and a warning circuit (not shown) associated with the reed switch 72 is activated to generate a warning signal to inform the operator of a failure mode condition in the brake system of the vehicle.

The float 76 is carried by the fluid in the reservoir assembly 40 in spaced relation to the reed switch 72. When the fluid level falls below a predetermined setting, the float 76 will position the magnet 80 against base 43 of part 42 adjacent the reed switch 72 to activate the associated warning circuit. The base 43 is provided with a transversely extending ridge 45 to form the second bore 70 and the magnet 80 is engageable with the ridge 45 when the fluid level is at or below the predetermined setting.

We claim:

1. A master cylinder comprising a housing having a first bore for retaining a pair of pistons which move to develop fluid pressure in a pair of pressure chambers to effect a brake application, a reservoir containing fluid which is in communication with the pair of pressure chambers when the pistons are in a rest position, a differential area piston connected to said pressure chambers and operable during a brake application to actuate a signal circuit in response to a failure mode in either pressure chamber, a float located in the reservoir and having a first magnet for actuating a switch in the signal circuit when the fluid level in the reservoir is below a predetermined level, characterized in that said housing has a second bore for receiving said differential area piston and first and second passages connected to said pair of pressure chambers for presenting fluid pressure to said differential area piston, said switch having a reed assembly located in alignment with said first magnet carried by said float in the reservoir and a second magnet carried by said differential area piston, said second bore receiving a shield member having first and second openings such that on movement of the differential area piston as a result of a failure mode, the magnetic field associated with the second magnet passes through one of the first and second openings to activate the reed switch and close the circuit to inform an operator of a failure mode condition.

2. The master cylinder as recited in claim 1 in which said shield member has a flange located in a groove to retain the shield member in a substantially fixed position within said second bore.

3. The master cylinder as recited in claim 2 wherein the polarity of the first and second magnets are in alignment to match the field required to activate the reed assembly.

4. The master cylinder as recited in claim 3 wherein said differential area piston has a projection which moves in a slot to maintain said second piston in a fixed alignment within the second bore.

* * * * *